United States Patent [19]

Hertzenberg

[11] Patent Number: 4,613,578

[45] Date of Patent: Sep. 23, 1986

[54] POROUS ZEOLITE GRANULES STABLE IN AQUEOUS SOLUTIONS

[75] Inventor: Elliot P. Hertzenberg, Wilmington, Del.

[73] Assignee: PQ Corporation, Valley Forge, Pa.

[21] Appl. No.: 725,064

[22] Filed: Apr. 19, 1985

Related U.S. Application Data

[63] Continuation-in-part of Ser. No. 622,363, Jun. 20, 1984, abandoned.

[51] Int. Cl.$^4$ .............................................. B01J 29/06
[52] U.S. Cl. ...................................................... 502/64
[58] Field of Search .................................... 502/8–10, 502/64

[56] References Cited

U.S. PATENT DOCUMENTS

| | | | |
|---|---|---|---|
| 3,296,151 | 1/1967 | Heinze et al. | 502/8 |
| 3,382,187 | 5/1968 | Drost et al. | 502/64 X |
| 3,624,003 | 11/1971 | Conde et al. | 502/64 |
| 3,764,563 | 10/1973 | Minachev et al. | 502/64 |

*Primary Examiner*—Carl F. Dees
*Attorney, Agent, or Firm*—E. G. Posner; J. S. Bobb; F. C. Philpitt

[57] ABSTRACT

Porous granules that contain separate particles of alkali metal silicate and zeolite are stable and are efficient ion exchangers in aqueous effluents and/or solutions. Said granules are heated to provide the stability required so that even though some silicate may dissolve when the granules are exposed to water, the zeolite does not disperse throughout the water.

12 Claims, No Drawings

POROUS ZEOLITE GRANULES STABLE IN AQUEOUS SOLUTIONS

This application in a continuation-in-part of my co-pending patent application U.S. Ser. No. 622,363, filed June 20, 1984 and now abandoned.

BACKGROUND OF THE INVENTION

This invention involves the use of zeolites as ion exchange materials and it particularly relates to preparing granules that are porous and stable in aqueous environments for such applications.

Zeolites have long been known as very efficient ion exchange materials. In order to realize high exchange capacities and rates the zeolites must be quite small crystal size. Such finely divided materials present considerable problems in treating flowing streams, which is the most convenient method of carrying out such processes. In efforts to improve the properties of zeolites in fluid media, beads and granules have been formed. Examples of such efforts are disclosed in U.S. Pat. Nos. 2,973,327 and 3,055,841. The first patent involves the bonding of zeolite crystals with clays to form desired larger bodies of the zeolite. The second patent involves mixing zeolites with a sodium silicate solution, forming the combination into beads by spray drying and exposing the beads to calcium chloride solution to harden them. These materials and others like them have good mechanical properties but are not sufficiently porous and therefore have poor ion exchange rates. U.S. Pat. Nos. 3,764,563; 3,624,003 and 3,382,187 also teach methods directed to improving the properties in fluids as well as other mechanical properties. These methods involve pressure to promote agglomeration, usually in the form of extrusion. While these materials have good mechanical properties, they tend to be less porous than ideal.

A porous granule of small particle size zeolite crystals would have excellent ion exchange properties. European Patent Application No. 0 021 267 and U.S. patent application Ser. No. 455,151, filed Jan. 3, 1983, (U.S. Pat. No. 4,528,276) disclose porous granules of separate particles of zeolite and sodium silicate, but these granules disintegrate, dispersing the zeolite particles throughout aqueous solutions.

It is an object of this invention to provide porous granules of zeolite and silicate that do not disintegrate upon exposure to water.

SUMMARY OF THE INVENTION

Porous granules or agglomerates that do not disintegrate on exposure to water and that have desirable ion exchange capacities and rates have been prepared by insolubilizing granules that consist of separate particles of hydrated zeolite and separate particles of hydrated alkali metal silicate. The agglomerates are prepared by adding moisture and then heating a mixture of zeolite and silicate. Usually Zeolite NaA and sodium silicate particles are used. Tumbling is continued after moisture addition and heating have induced agglomeration, to consolidate and stabilize the particles. Screening and drying complete the preparation of the intermediate granules. The silicate portion of the granules is then insolubilized by heating at controlled temperatures. The granules are rehydrated by exposure to water vapor or sprays to complete the preparation.

The starting zeolites are of small crystal size and tend to have poor mechanical properties in liquids. The porous insoluble granules that do not disintegrate have much improved properties such as decreased pressure drop through a column while maintaining desirable levels of ion exchange capacity and rate.

The granule of my invention has certain important advantages over the prior art zeolite composite structures such as those bonded with clay or liquid silicate. My granules are prepared with separate particles of zeolite and silicate, and the pores of the zeolite are not blocked. When zeolites are agglomerated with liquid silicate, access to the interior structure, i.e., ion exchange sites, is reduced significantly. My granules are more porous than those bonded with clays as demonstrated by their bulk density, which is about three-fourths of the bulk density of the clay bonded zeolites. These properties and advantages are very important for the desired use of my granules.

THE INVENTION

The alkali metal silicate powders or particles required as a raw material for the agglomerates of my invention may be obtained by spray drying, fluid bed drying or other equivalent method of drying sodium and/or potassium silicate solutions. Spray drying is usually preferred because this process produces large quantities of relatively dense, small particles that are suitable for my process, at reasonable cost. The $SiO_2/M_2O$ mole ratio can be 1.4 to 4.5, wherein M stands for sodium, potassium or a combination thereof. Higher $SiO_2/M_2O$ ratios can be used if a combination of silicate and silica sol is dried. I prefer to use sodium silicate that has 2.0 to 4.0 moles of $SiO_2$ per mole of $Na_2O$. Very good results can be obtained using silicates with 2.5 to 3.8 moles of $SiO_2$ per mole of $Na_2O$. I most prefer 3.0 to 3.4 moles of $SiO_2$ per mole of $Na_2O$.

The moisture content of the starting silicate particles is important and should be above about 10%. I prefer that the water content of the silicate particles be between 15 and 30%.

A variety of synthetic and natural zeolites are useful as the second ingredient in my composition. I prefer synthetic zeolites since they can be prepared with the exact combination of properties desired. Sodium aluminosilicates such as those described in U.S. Pat. Nos. 2,882,243-4; 3,012,853; 3,130,007; 3,329,628; 3,720,756 and 3,802,326, among others, are useful.

I usually use a zeolite that conforms to the formula:

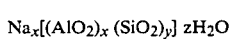

$$Na_x[(AlO_2)_x (SiO_2)_y] zH_2O$$

In this formula, x and y approximate integers; the molar ratio of x to y is in the range of 0.1 to 1.1 and z approximates an integer from about 8 to 250. In general, z is a value such that the water content is between about 20 and 30% by weight of the zeolite. I prefer to use Zeolite NaA wherein x and y are about 12, and z is about 20 to 27. Another useful zeolite has a composition wherein x approximates an integer between 80 and 96, y approximates an integer between 112 and 96, and z is between 220 and 270 representing a water content of about 18 to 30%.

Zeolite NaA is the preferred starting ion exchange material. Mixtures of Zeolite NaA and Zeolite NaX are also preferred. It is important that this material be hydrated. A loss on ignition (LOI) of 19 to 25% by weight satisfies this requirement. The mean paricle size of the Zeolite NaA should be less than 10 microns. I prefer a particle size of 2 to 6 microns.

The granules of this invention contain considerably more zeolite than silicate. Only sufficient silicate to provide the required binding is preferred. I find that compositions with 4 to 14 pbw of zeolite for each pbw of silicate are satisfactory. I prefer 6 to 9 pbw of zeolite for each pbw of silicate. While granules can be formed at ratios about 9 pbw of zeolite for each pbw of silicate, they are more easily formed when there are about 7 pbw of zeolite per pbw of silicate. The ease of formation allows less compacted, more porous granules to be formed.

Small amounts of additional materials can also be added to my granules for various purposes. These materials are usually adsorbents such as activated carbon, for example.

The separate particulate components of my agglomerates can be blended in any convenient manner, but are usually tumbled in a drum or other revolving cylindrical container. After a uniform mixture of the particles is achieved, tumbling is continued during moisture addition and heating. I define tumbling as keeping the mixture loose and in motion. Maintaining said loose character often requires mechanical assistance to overcome the physical characteristics of the particle mixture, particularly during addition of moisture which must be distributed uniformly throughout the mixture. After moisture is added and any lumps have been eliminated, tumbling during heat application facilitates heat transfer and further moisture redistribution. Tumbling of this type requires that the particles be freely in motion without forcing or preventing contact between the particles. The motion causes repeated collisions and rolling among the particles so that as the silicate particles develop adherent surfaces, the particles stick together and eventually form into granules having survival strength. Finally, tumbling during cooling keeps the agglomerates freely in motion until any adherent character is lost by recooling and moisture dissipation.

Tumbling of the desired nature may be obtained using revolving drum, pan, sphere or tube. For instance, a closed metal or plastic container might be partially filled with the dampened particle mixture and rotated horizontally while being heated externally with gas burners, hot air, heat lamps or by being submerged in a bath of heat transfer liquid. Lifts can be attached to the drum wall to facilitate tumbling, and the drum can be designed to eliminate interior corners or provided with knockers to free or minimize material lodging where it could consolidate as chunks rather than free-flowing granules. An open or continuous system of a similar nature can consist of a slightly inclined pipe or tube, either rotating with lifts or non-rotating with an internal screw, to lift, tumble and convey through dampening, warming, shaping, recooling and redrying zones.

Although both particulate materials are hydrated, additional water is required to initiate agglomeration. The particle mixture must be dampened with sufficient water to initiate granulation in order to produce the desired product from the subsequent heating step. While the amount of water required will vary according to the composition of the particle mixture and the raw materials, the effective range of water addition is surprisingly narrow. Water additions of 15 to 35 pbw per 100 pbw of particle mixture are effective, and I prefer to use 16 to 30 pbw of water per 100 pbw of particle mixture. Less water reduces the yield of desirable granules while more water increases the density of the product to an unsatisfactory level. The water can be introduced into the tumbling material by various means such as vapor from steam jets, water from a fine sprayer, sparger pipes or an intensifier bar, and distributed throughout the mixture before heating begins. The dampened mixture is tumbled until agglomeration begins. The partially agglomerated material is passed through a relatively large screen (larger particles are grated through the screen) before the heating step. This screening helps prevent the formation of very large agglomerates.

The now partially agglomerated particle mixture is tumbled as previously described in a closed container. The heat is applied to the particles indirectly through the walls of the container which are heated in any convenient manner; the tumbling action serves to distribute heat throughout the mixture. The heating rate, the maximum temperature attained, the holding time at the maximum temperature and the rate of cooling depend upon the composition of the mixture and the characteristics desired in the final product. I obtain the product characteristics I desire by heating the particle mixture to a maximum temperature of 80° to 130° C. at a rate of 4° to 15° C. per minute. The maximum temperature can be held 0 to 30 minutes while the agglomerates are cooled at 5° to 15° C. per minute. If the intermediate product is well formed, then tumbling during this heating is not required.

The agglomerates are screened; the oversized materials are ground while the fines may be removed and recycled with the crushed oversized material to a fresh particle mixture. The fine material can also remain with the agglomerated material because further agglomeration may occur in the redrying step. The desired fraction is then dried by tumbling and heating the agglomerates. At least 70% of the moisture added to the particle mixture should be removed; I prefer to remove 80% or more of the water added.

The mechanism by which my agglomerate forms can be summarized as follows. The action of the added moisture and heat is to soften the surfaces of the alkali metal silicate by partial hydration. The softening surfaces become adherent to the zeolite particles, and granules are formed. As tumbling continues, the granules become somewhat rounded and compacted. Finally, as tumbling continues and as the surfaces lose their adherent character through recooling and moisture dissipation, a free-flowing granular product is realized.

This intermediate product now requires treatment to render the silicate insoluble and the granule stable in aqueous solutions. Such treatment should not be carried out in a solution mode, such as exposing the granules to a solution containing a calcium salt, since aqueous contact can degrade the granule and reduce porosity. The granules can be heat treated under any conditions of time and temperature that reduce the solubility of the silicate to the point at which the granule will not disintegrate so that zeolite does not disperse throughout an aqueous solution. In general, the temperature should be in excess of about 225° C. but less than about 515° C. The heating period varies with the temperature and the $SiO_2/M_2O$ ratio of the silicate used, but usually an hour or more is required. If the ratio of $SiO_2$ to $M_2O$ is about 3 or more, temperatures of about 225° to 300° C. are very effective in providing the desired product. If the $SiO_2/M_2O$ ratio is less than about 3, temperatures of 400° to 515° C. are required. Of course, the materials containing the higher ratio silicate can be insolubilized at temperatures considerably above 300° C. as well.

The product granules can be made in any size required for the application, but usually are in the range of 150 to 2000 microns. The granules are not friable and have sufficient strength to support columns of the granules at bulk densities of about 28 to 42 lb/sq ft with the zeolite fully hydrated. They have sufficient porosity to allow flow through a column of the material without a drastic pressure gradient. These materials exhibit very good ion exchange capacity and rates. Even though some silicate may be leached from the granule on contact with water, the granule remains intact and the zeolite particles are not dispersed.

Usually granules that contain a single zeolite species are used, but granules that contain several types of zeolite can be made if required. Of course, mixtures of several granules each of which contains a different type of zeolite may also be useful. They are especially suited for single pass applications involving removing small amounts of metal contaminants from large amounts of aqueous effluents and discarding the exchanged zeolite granules.

EXAMPLES

The following examples illustrate certain embodiments of my invention. These examples are not presented to establish the scope of the invention, which is fully recited in the disclosure and the claims. The proportions are in parts by weight (pbw) or percent by weight (%) unless otherwise indicated. Calcium salts and ions are used in these examples since analysis is easy, rather than illustrating practical applications of my granules. The raw materials used in the examples were:

BRITESIL ® C24 hydrous sodium silicate
2.40 $SiO_2/1.0$ $Na_2O$;
23.8% $Na_2O$ (57.2% $SiO_2$; 19.0% $H_2O$)
G ® sodium silicate
3.3 $SiO_2/1.0$ $Na_2O$
19.2% $Na_2O$ (61.8% $SiO_2$; 19% $H_2O$)
Zeolite NaA containing 21% $H_2O$
BRITESIL and G are registered trademarks of PQ Corporation.

EXAMPLE 1

BRITESIL C24 (100 pbw) and zeolite NaA (400 pbw) were blended by tumbling in an open container tilted at 45° from the horizontal. Tumbling was continued until the mixture was uniform. Then 100 pbw of water was sprayed onto the mixture and tumbling continued until some agglomeration was observed. The dampened mixture was passed through a 14-mesh screen and placed in a heating vessel. The heating vessel was a closed cylinder with tubular lifts that encourage tumbling action during horizontal rotation. The cylinder was rotated at 30 rpm and heated from 21° C. to 100° C. in 5 minutes and recooled to 35° C. in 10 minutes. The agglomerated material was then heated in an open container while tumbling gently, thereby removing most of the water added to initiate agglomeration. The material was screened to provide 10 to 70 mesh material.

EXAMPLE 2

BRITESIL C24 (50 pbw) and the zeolite (500 pbw) were subjected to the process described in Example 1 and 10 to 70 mesh material prepared.

EXAMPLE 3

Granules prepared as described in Example 1 were heat treated to determine condition required to render them stable in water. Equal portions of the granules were heated at 90° C., 200° C., 275° C. or 400° C. for 2 hours. The granules were contacted with water to determine the effect of heating. The results are as follows:

TABLE 1

| Heat Treatment of 4:1 Zeolite:Silicate Granules (Temp °C.) for 2 hours | Behavior on Contact with Water |
| --- | --- |
| — | Disintegrates in 15 seconds. |
| 90 | Some release of zeolite. |
| 200 | Slight release of zeolite. |
| 275 | Slight release of zeolite. |
| 400 | No release of zeolite. |

The granules prepared as described in Example 2 were heated at 400° C. for 1 hour and 2 hours as well; both portions were equally stable in water.

EXAMPLE 4

The degree of stability of some of the granules heat treated as described in Example 3 can be indicated by measuring the sodium released by the granules. The granules were slurried with water for a specific time under mild agitation, filtered and the sodium ion measured using a sodium ion electrode. The results are summarized in the following table.

TABLE 2

| Sodium Ion Release from Insolubilized Granules | | | | |
| --- | --- | --- | --- | --- |
| Insolubilization Temperature (°C.) | Temperature of Slurry (°C.) | Sodium Ion Concentration at time | | |
| | | 10 min. (%) | 60 min. (%) | 24 hr. (%) |
| 200 | 22 | 0.043 | 0.047 | 0.063 |
| 275 | 22 | 0.030 | 0.038 | 0.064 |
| 400 | 22 | 0.020 | 0.025 | 0.055 |

These results indicate that the granules treated at 400° C. for 2 hours are more stable than those treated at lower temperatures and even through some silicate is dissolved from the granules the zeolite is not released.

EXAMPLE 5

The 4:1 (Example 1) and 10:1 (Example 2) granules were treated as described in Example 3 and tested for metal ion exchange in column flow experiments. Twenty grams of the granules were washed and placed in a 1.9 cm column. The height of the bed was about 9 cm so that the height-to-diameter ratio was 4.5 to 5.0. A solution containing 1000 mg of $Ca^{+2}/L$ was passed through the columns and the $Ca^{+2}$ content of the effluent measured with a selective electrode. At a flow rate of 12–13 bed volumes per hour the 4:1 granules showed a $Ca^{+2}$ breakthrough at 24 bed volumes while the 10:1 showed $Ca^{+2}$ breakthrough at 52 bed volumes.

EXAMPLE 6

Two equal portions of the 10 pbw zeolite/1 pbw silicate granules prepared as described in Example 2 were heat treated. One portion was heated at 400° C. for 2 hours; the other portion was heated at 530° C. for 2 hours. These materials were tested for metal ion exchange in column flow experiments. They were placed in columns and had a height to diameter ratio of about 7. The solution contained 100 mg/L of calcium ion and was passed through the column at 45 bed volumes per hour. Breakthrough of the $Ca^{++}$ was observed at about 220 bed volumes for the material heated at 400° C. Breakthrough was at about 15 bed volumes for the other material. These results indicate that the ion exchange properties of my granules can be degraded if heated at too high a temperature.

EXAMPLE 7

A somewhat larger preparation of granules containing 7 pbw of zeolite per pbw of zeolite was carried out using a Patterson-Kelley twin shell blender. The zeolite (2800 pbw) and G sodium silicate (400 pbw) were charged and tumbled until uniform, then 1100 pbw of water was added in about 3 minutes through an intensifier bar. After addition of the water is complete, tumbling is continued until uniform granules with sufficient strength for handling are formed. Then the granules are discharged and dried in a layer of less than about ½ inch. The granules were dried at 90° C. for 4 hours prior to sizing. The appropriate granules (smaller than 16 mesh, larger than 50 mesh, in this case) were then heated to produce insoluble granules. Samples were heated at various temperatures to determine the temperature required to render the granules stable in water. These results are summarized in the following table.

TABLE 3

| Insolubilizing Temperature (°C.) | $SiO_2$ Released* (ppm) | | | Integrity $H_2O$ Soak | |
|---|---|---|---|---|---|
| | 10 min | 20 min | 24 hr | Accelerated** | Long-term*** |
| 90 | 300 | 570 | 530 | fair | fair |
| 140 | — | — | — | good–fair | good |
| 175 | — | — | — | good–fair | good |
| 225 | 55 | 120 | 150 | good | good |
| 300 | — | — | — | good | good |
| 350 | — | — | — | good | good |
| 400 | 37 | 86 | 140 | good | good |

*2 g of granules/100 ml $H_2O$
**2.5 g of granules/100 g $H_2O$-appearance after 10 min at boiling.
***2.5 g of granules/100 g $H_2O$-appearance after at least one month at room temperature.

These results indicate that temperatures above about 225° C. are effective to insolubilize the intermediate granules.

EXAMPLE 8

Two materials made by the process described in Example 7 are dried at 400° C. for 2 hours were tested for calcium ion exchange under conditions similar to those described previously. The samples had bulk densities of 29.4 lb/cu ft at 20.7% moisture and 32.5 lb/cu ft at 20.2% moisture. Calcium ion breakthrough (4ppm Ca) was 200 bed volumes for the first sample and 229 bed volumes for the second sample. The initial concentration was 100 ppm of $Ca^{+2}$ and the flow rate was 42 to 47 bed volumes per hour.

I claim:

1. Porous zeolite-silicate granules stable in aqueous effluents and solutions and suitable for ion exchange consisting of particles of zeolite adhering to particles of alkali metal silicate, 4 to 15 parts by weight of zeolite being present for each part by weight of silicate, said silicate containing 1.4 to 4.5 moles of $SiO_2$ per mole of $M_2O$, wherein M is sodium, potassium or a mixture thereof, and having 18 to 22% moisture with bulk densities of 28 to 42 lb/cu ft, said granule being rendered stable in aqueous systems by heating to insolubilize the silicate.

2. The granules of claim 1 wherein there are 6 to 9 parts by weight of zeolite for each part by weight of silicate.

3. The granules of claim 1 wherein said granules are rendered stable in aqueous systems by heating above about 225° C. for an hour or more.

4. The granules of claim 2 wherein said granules are rendered stable in aqueous systems by heating above about 225° C. for an hour or more.

5. Porous zeolite-silicate granules stable in aqueous effluents and solutions and suitable for ion exchange consisting of particles of zeolite adhering to particles of sodium silicate, 4 to 15 parts by weight of said zeolite being present for each part by weight of silicate and the silicate containing 2.0 to 4.0 moles of $SiO_2$ for each mole of $Na_2O$, and having 18 to 22% moisture with bulk densities of 28 to 42 lb/cu ft, said granules being rendered stable in aqueous systems by heating to insolubilize the silicate.

6. The granules of claim 5 wherein they are heated above about 225° C. and below about 515° C.

7. The granules of claim 5 wherein there are 6 to 9 parts by weight of zeolite for each part by weight of sodium silicate and said silicate contains 2.5 to 3.8 moles of $SiO_2$ per mole of $Na_2O$, wherein the granules are heated to temperatures between about 225° and 300° C.

8. Porous zeolite NaA silicate granules stable in aqueous effluents and solutions and suitable for ion exchange consisting of particles of zeolite adhering to particles of sodium silicate, 6 to 9 parts by weight of Zeolite NaA being present for each part by weight of sodium silicate, said silicate containing 3.0 to 3.4 moles of $SiO_2$ per mole of $Na_2O$, and having 18 to 22% moisture with bulk densities of 28 to 42 lb/cu ft, said granules being rendered stable in aqueous systems by heating between about 225° and 300° C. to insolubilize the silicate.

9. The process of preparing porous zeolite-silicate granules stable in aqueous effluents and solutions and suitable for ion exchange comprising the steps of:
   (a) tumbling a mixture of separate particles of zeolite and spray dried alkali metal silicate, the amount of silicate being sufficient to provide binding action;
   (b) adding sufficient water to said tumbling mixture to initiate agglomeration between the zeolite and silicate particles;
   (c) heating and tumbling the dampened partially agglomerated mixture in a closed container for a time sufficient to complete formation of granules;
   (d) heating the tumbling granules in an open container to remove at least about 80% of the moisture added in step (b);
   (e) heating the granules to render them stable in aqueous systems; and
   (f) rehydrating the granules by exposure to moisture vapor or spraying with water.

10. The process of preparing porous Zeolite NaA sodium silicate granules which are stable in aqueous effluents and solutions and suitable for ion exchange, comprising the steps of:
   (a) tumbling a mixture of 4 to 15 parts by weight of particles of Zeolite NaA for each part by weight of particles of sodium silicate that contains 2.0 to 4.0 moles of $SiO_2$ for each mole of $Na_2O$;

(b) adding sufficient water to said tumbling mixture to initiate agglomeration between the zeolite and silicate particles;

(c) heating and tumbling the dampened partially agglomerated mixture in a closed container for a time sufficient to complete formation of granules;

(d) heating the tumbling granules in an open container to remove at least about 80% of the moisture added in step (b);

(e) heating the granules above about 225° C. but below about 515° C., thereby stabilizing said granules in aqueous systems; and (f) rehydrating the granules to 18 to 22% water by exposure to water vapor or a water spray.

11. The process of claim 10 wherein there are 6 to 9 parts by weight of zeolite for each part by weight of sodium silicate and said silicate contains 2.5 to 3.8 moles of $SiO_2$ per mole of $Na_2O$, wherein the granules are heated to temperatures between about 225 and 300° C.

12. The process of claim 10 wherein the silicate contains 3.0 to 3.4 moles of $SiO_2$ per mole of $Na_2O$.

* * * * *